US006053258A

United States Patent [19]

Shimada et al.

[11] Patent Number: 6,053,258

[45] Date of Patent: Apr. 25, 2000

[54] HYDRAULIC DRIVEN TOOL CONTROLLING APPARATUS

[75] Inventors: Keisuke Shimada; Michihiro Shoji, both of Tokyo, Japan

[73] Assignee: Nitto Kohki Co., Ltd., Tokyo, Japan

[21] Appl. No.: 09/333,557

[22] Filed: Jun. 16, 1999

Related U.S. Application Data

[62] Division of application No. 08/983,235, filed as application No. PCT/JP97/00879, Mar. 18, 1997.

[30] Foreign Application Priority Data

May 31, 1996 [JP] Japan .................................... 8-159120

[51] Int. Cl.[7] ....................................................... B23Q 5/033

[52] U.S. Cl. .................................... 173/2; 173/4; 173/11; 173/19; 173/171

[58] Field of Search ............................... 173/2, 4, 13, 11, 173/19, 171, 206; 364/474.19, 508

[56] References Cited

U.S. PATENT DOCUMENTS

| | | | |
|---|---|---|---|
| 3,469,487 | 9/1969 | Brolund | 83/527 |
| 3,924,330 | 12/1975 | Mitsuhashi et al. | 30/362 |
| 5,170,358 | 12/1992 | Delio | 364/508 |
| 5,289,885 | 3/1994 | Sakoh | 173/2 |
| 5,303,162 | 4/1994 | Yoon | 173/2 |
| 5,474,138 | 12/1995 | Evarts | 173/4 |

FOREIGN PATENT DOCUMENTS 51-118172 10/1976 Japan .

*Primary Examiner*—Scott A. Smith

*Attorney, Agent, or Firm*—Westman, Champlin & Kelly, P.A.

[57] ABSTRACT

When a start SW 3 is pressed, a one-shot multivibrator circuit 15 turns on and releases a pulse. The pulse is transmitted to a self-hold circuit 16 which in turn stays in self-hold mode and releases an H level output continuously until it is reset. This cause a transistor 17 to turn on and actuate a ram downward movement relay R1. When the ram arrives at the lower limit of its movement, a lower LS 4 is opened causing a self-hold circuit 21 to produce an H level signal in accordance with an output of a one-shot multivibrator 18. The H level signal from the self-hold circuit 21 is delayed by a delay circuit 22 and turns on a transistor 23. As the result, a ram upward movement relay R2 is actuated. Because of the function of the one-shot multivibrator circuit 15, the ram will not restart when the start SW 3 is continuously depressed. The delay circuit 22 contributes to the longer operational life of a directional valve switching mechanism. Also, a combination of another delay circuit 19 and a logical product circuit 24 is provided for preventing any fault action derived from, chattering of the lower LS 4.

2 Claims, 6 Drawing Sheets

HYDRAULIC DRIVEN TOOL CONTROLLING APPARATUS

CROSS REFERENCE TO RELATED APPLICATION

This application is a divisional of application Ser. No. 08/983,235, filed Jan. 12, 1998 for HYDRAULIC DRIVEN TOOL CONTROLLING APPARATUS, now U.S. Pat. No. 5,992,536.

TECHNICAL FIELD

The present invention relates to a hydraulic driven tool controlling apparatus and particularly, a controlling apparatus for controlling the action of a hydraulic driven tool such as a puncher for punching out desired sizes of holes in a sheet workpiece of e.g. stainless steel.

BACKGROUND ART

One of such hydraulic driven punchers is a reciprocal, automatic-return type puncher. An example of the reciprocal, automatic-return puncher is schematically illustrated in FIG. 7.

As shown, there is a punch 32 attached to the lower end of a ram 31. An upper limit switch 33 and a lower limit switch 34 are provided on both sides of the upper part of the ram 31. A hydraulic pump 36 is arranged for delivering a flow of hydraulic oil via a directional control (solenoid operated) valve 37 (abbreviated to directional value 37 hereinafter) to a cylinder 35. This allows the ram 31 to move upward and downward in reciprocal action. A controller 41 is provided responsive to command signals from a start (downward operation) switch 42 and an upward operation switch 43 and detection signals from the upper 33 and the lower limit switch 34 for controlling the actions of the hydraulic pump 36 and the directional valve 37.

It is now assumed that the ram 31 stays at the upper end of its movement and the upper 33 and the lower limit switch 34 remain pressed down with its contacts closed. When the start switch 42 is turned on, an upper chamber 35*a* of the cylinder 35 is loaded with the hydraulic oil while a lower-chamber 35*b* is exhausted. As the ram 31 starts moving downward, the contact of the upper limit switch 33 is opened. When the ram 31 arrives at the lower limit of its movement, the contact of the lower limit switch 34 is opened and the arrival of the ram 31 at the lower end is detected. The opening of the contact of the lower limit switch 34 causes the controller 41 to shift the directional valve 37 for filling the lower chamber 35*b* of the cylinder 35 with the hydraulic oil and exhausting the upper chamber 35*a*. This allows the ram 31 to automatically move upward. As the ram 31 starts moving upward, the contact of the lower limit switch 34 is closed. Upon the ram 31 arriving at the upper end of its movement, the contact of the upper limit switch 33 is closed. Simultaneously, the controller 41 detects the arrival of the ram 31 at the upper limit and stops the action of the hydraulic pump 36. In this manner, an automatic return movement of the puncher is implemented.

However, said prior art has a problem that if the start switch 42 is maintained turned on, the ram 31 may automatically start again after its cycle movement. If the start switch 42 is turned on with the ram 31 staying off the upper limit of its movement, the ram 31 may move undesirably.

In common, the directional valve 37 comprises two, first and second, solenoids 37*a* and 37*b,* two pushrods 37*c* and 37*d* made of e.g. stainless steel, and a directional chamber 37*e,* as shown in FIG. 8. The directional chamber 37*e* has a spool 37*f* provided in its tubular oil passage for movement leftward and rightward in response to the magnetization of the first 37*a* and the second solenoid 37*b.* It is known for shifting the valve 37 upon the ram 31 arriving at the lower limit to demagnetize one 37*a* (or 37*b*) of the two solenoids and magnetize the other 37*b* (or 37*a*) at once. This however causes a remaining magnetic force of the demagnetized solenoid to activate both the left 37*c* and the right pushrod 37*d* for a brief moment thus driving the spool 37*f* from both sides. As the result, either the pushrod 37*c* or 37*d* may be deformed and the operating life of the directional valve 37 may be decreased.

Also, the contact of the lower limit switch 34 remains closed before the ram 31 arrives at the lower limit during the punching action. It is opened only when the punching action has been finished and then the ram 31 arrives at the lower limit. The punching in a hard material such as a stainless sheet often produces a great force of impact causing chattering or malfunction of the contact of the lower limit switch 34. If worse, the contact of the lower limit switch 34 may physically be disconnected.

DISCLOSURE OF THE INVENTION

It is an object of the present invention to provide a hydraulic driven tool controlling apparatus which is arranged not to restart when a start switch remains pressed down while eliminating the foregoing drawbacks of a prior art. It is another object of the present invention to provide a hydraulic driven tool controlling apparatus including a directional valve which has a long operating life and of which pushrods are prevented from deformation. It is a further object of the present invention to provide a hydraulic driven tool controlling apparatus which is not malfunctioned even if a great force of impact produced by punching action causes the contact of a lower limit switch to open for a moment.

For achievement of the primary object, a first feature of the present invention is embodied in the form of a hydraulic driven tool controlling apparatus for driving upward and downward movements of a ram in a cylinder with the use of hydraulic power which comprises: a start switch means for starting up the downward movement of the ram; a turn-on detection signal output means responsive to the turning on of the start switch means for delivering a turn-on detection signal to allow one cycle of the downward movement of the ram; and a directional valve controlling means responsive to the turn-on detection signal from the turn-on detection signal output means for shifting a flow of hydraulic oil which acts on the ram for carrying out the downward movement.

A second feature of the present invention is embodied in a combination comprising: a lower limit detecting means for detecting the lower limit of a movement of the ram; a directional valve controlling means responsive to a detection signal from the lower limit detecting means for shifting a flow of hydraulic oil which acts on the ram from the downward movement to the upward movement; and a pause period generating means for providing a pause period of a predetermined length in a switching action between the downward movement and the upward movement.

A third feature of the present invention is also embodied in a combination comprising: a lower limit detecting means for detecting the lower limit of a movement of the ram; a directional valve controlling means responsive to a detection signal from the lower limit detecting means for shifting a flow of hydraulic oil which acts on the ram from the downward movement to the upward movement; and a fault action preventing means for absorbing chattering of the lower limit detecting means caused by vibration of the ram thus to prevent the directional valve controlling means from producing a fault derived from the chattering.

According to the first feature of the present invention, one turn-on detection signal is released upon every turn-on action of the start switch means. As the turn-on detection signal is not released even if the turn-on action of the start switch means is continued, unwanted restart of the apparatus will be prevented.

The second feature of the present invention provides the pause period in the switching action of the directional valve between the downward movement and the upward movement. This allows either solenoid in the directional valve controlling means to be demagnetized during the pause period so that two pushrods of their respective solenoids are prevented from unwillingly urging the directional valve from both sides. Hence, the pushrods will be prevented from deformation and the operational life of the directional valve mechanism will be increased.

According to the third feature of the present invention, the chattering of the lower limit detecting means caused by vibration of the ram during making a punch hole in a workpiece will successfully be eliminated hence avoiding a fault action of the directional valve controlling means which may permit the ram to adversely move upward before it arrives at the lower limit.

BEST MODE FOR CARRYING OUT THE INVENTION

Figure 1:
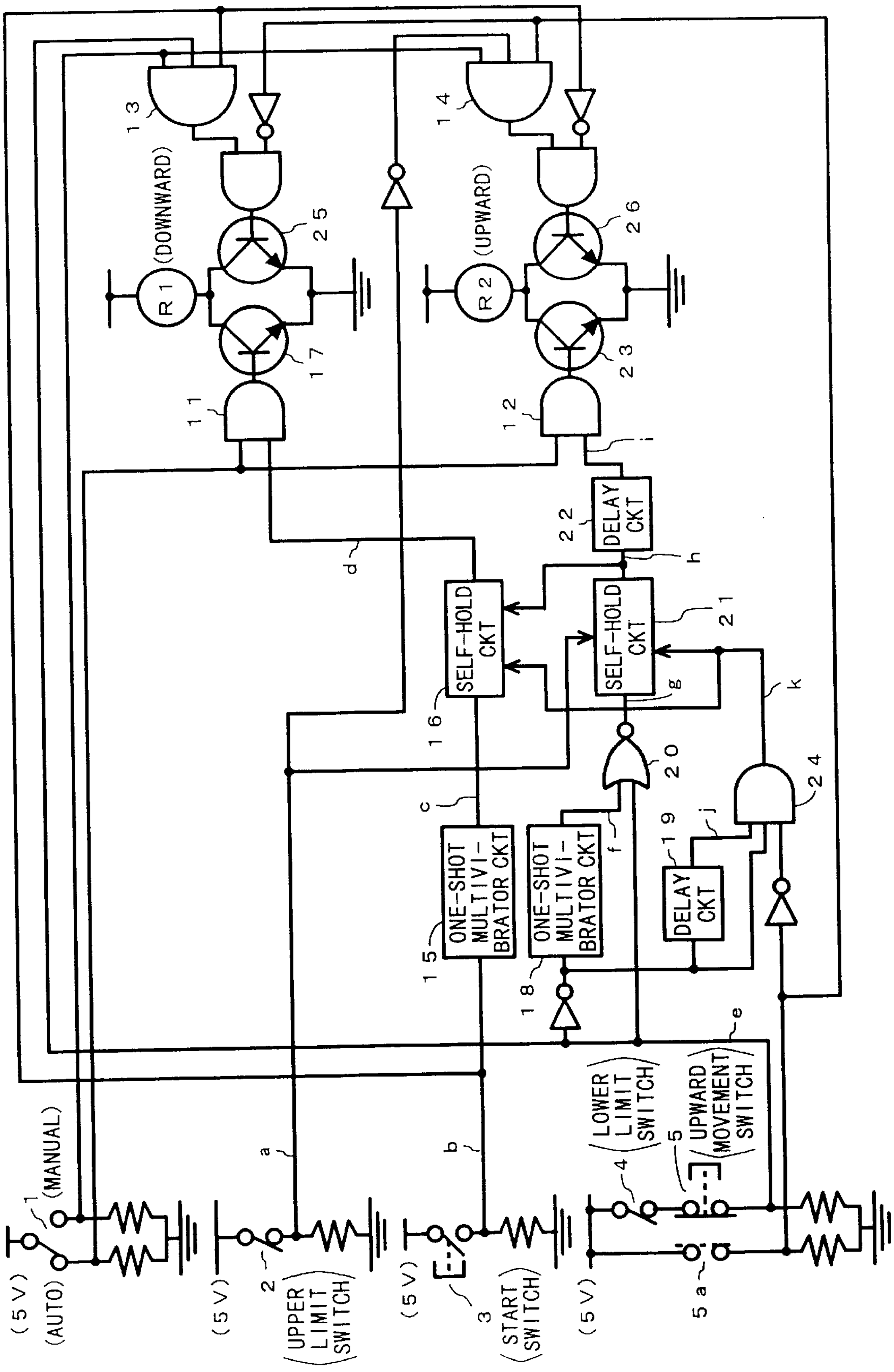
FIG. 1 is a circuitry diagram showing one embodiment of the present invention.
Figure 7:
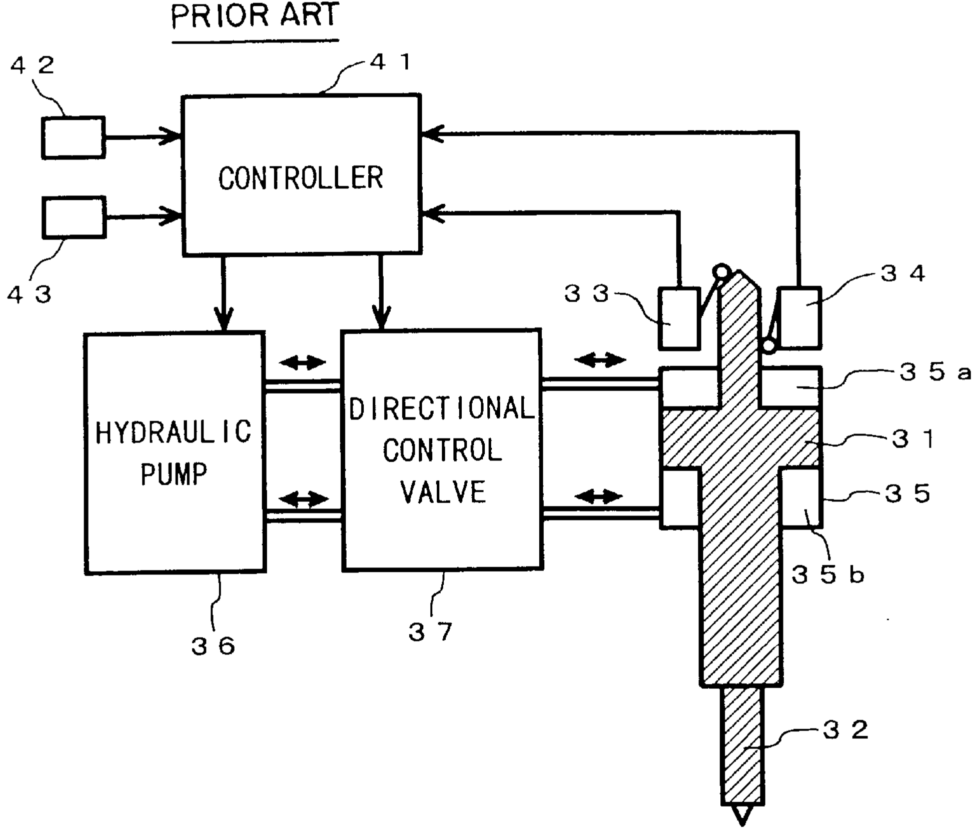
FIG. 7 PRIOR ART
FIG. 7 is a schematic block diagram of a conventional hydraulic driven tool controlling apparatus.

The present invention will be described in more detail referring to the accompanying drawings. FIG. 1 is a circuitry diagram of a hydraulic driven tool controlling apparatus according to one embodiment of the present invention. A mechanism of a hydraulic driven tool including a ram, a punch, and two, upper and lower, limit switches is identical to that shown in FIG. 7 and will be explained in no more detail.

As shown in FIG. 1, there are provided an auto/manual selector switch 1 for switching between auto and manual modes of the hydraulic driven tool, an upper limit switch 2 (abbreviated to upper LS 2 hereinafter), a start (or downward movement), switch 3 (abbreviated to start SW 3), a lower limit switch 4 (abbreviated to lower LS 4), and an upward movement switch 5 (abbreviated to upward SW 5). One of two contacts of each switch is loaded with a source voltage (for example, 5 volts) and the other is grounded via a resistor.

The auto/manual selector switch 1 is connected at the auto mode for automatic action of the hydraulic driven tool and at the manual mode for manual action of the same. The contact of the upper LS 2 remains closed when the ram is at the upper limit of its movement and open when it is off the upper limit. The start SW 3 is normally opened and when pressed, turns to close. The contact of the lower LS 4 remains closed when the ram is off the lower limit and opens only when it is at the lower limit. The upward SW 5 is normally positioned as denoted by the real line and when pressed for upward movement of the ram, is shifted to a position 5*a* denoted by the dotted line.

The operation of the hydraulic driven tool controlling apparatus of the embodiment will be explained in conjunction with FIG. 2 which is a timing chart of signals involved in a primary part of the apparatus.

First, explained is the operation with the automatic mode of the hydraulic driven tool. As the auto/manual selector switch 1 is connected at the auto mode, the signal to input terminals of two AND circuits 11 and 12 is at H (high) level and the signal to input terminals of two AND circuits 13 and 14 is at L (low) level. The contact of the upper LS 2 is closed with the ram remaining at the upper limit and allows H level of a signal denoted at a to pass.

Figure 2:
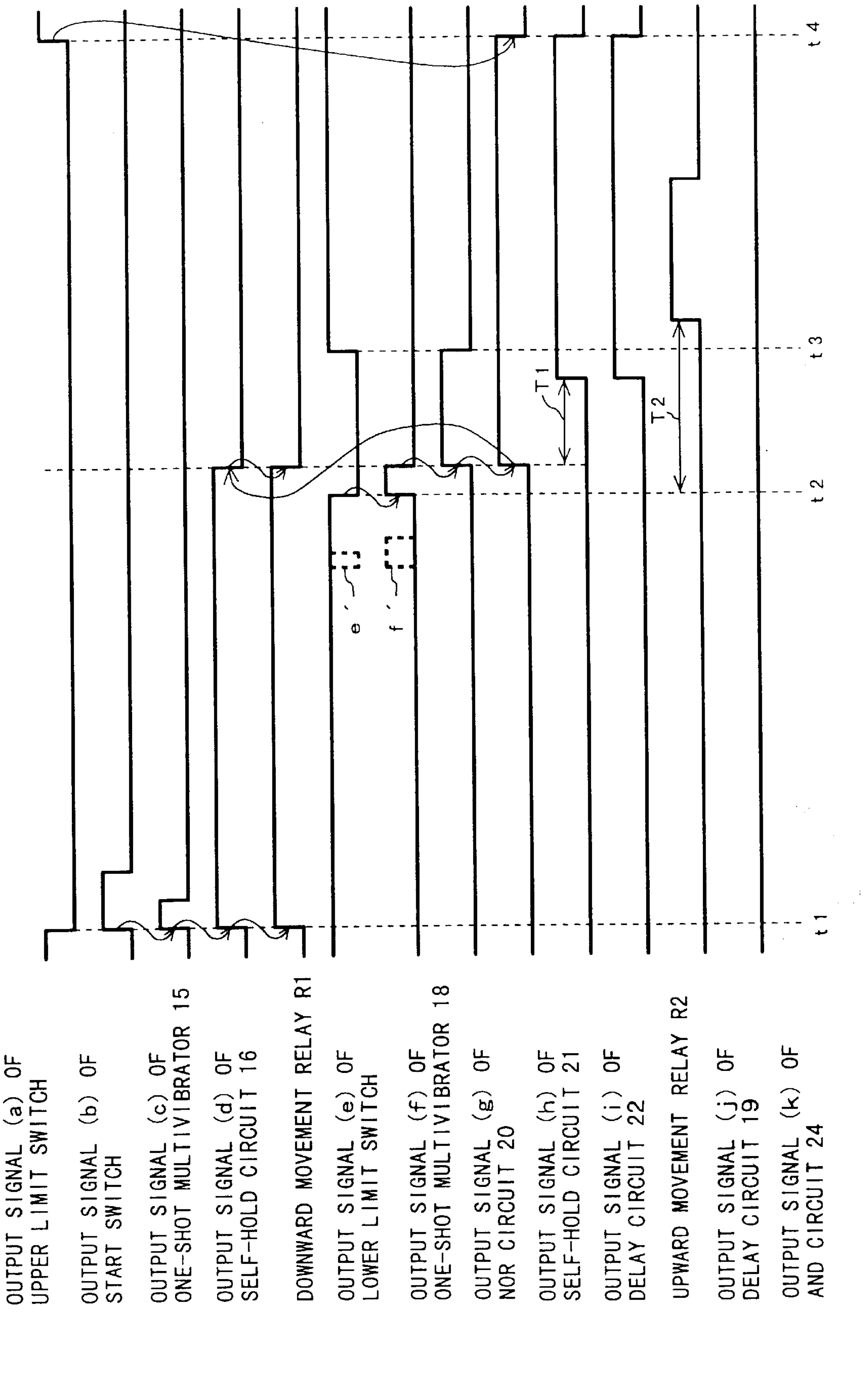
FIG. 2 is a timing chart showing signals involved in a primary part of the circuit shown in FIG. 1.

When the start SW 3 is pressed down and turned on at a time t1, it delivers a pulse signal b to a one-shot multivibrator circuit 15 as shown in FIG. 2. The one-shot multivibrator circuit 15 triggered by the pulse signal b produces a pulse output c which has a given pulse width.

The output signal c is then transmitted to a self-hold circuit 16 which in turn delivers an H level output. The output signal d of the self-hold circuit 16 is maintained at the H level until the self-hold circuit 16 is loaded with a reset signal. An arrangement of the self-hold circuit 16 will be described later in more detail referring to FIG. 4.

When the output signal d of the self-hold circuit 16 is turned to H level, the AND circuit 11 releases an H level output hence turning on a transistor 17. Accordingly, a downward movement relay R1 is enabled.

The enabling of the relay R1 is maintained so long as the output signal d of the self-hold circuit 16 is at the H level. Upon the downward movement relay R1 being enabled, the ram is lifted down by means of hydraulic power as will be described later in more detail in conjunction with FIG. 3.

As the ram is moved downward, it punches out a workpiece. When the ram arrives at the lower limit of its movement at a time t2, the contact of the lower LS 4 is opened thus shifting its signal e to L level. This enables a one-shot multivibrator circuit 18 to produce and transmit a pulse signal f of a given width to one of two inputs of a NOR circuit 20. The NOR circuit 20 has the other input loaded with the signal e of L level and in response to the decay of the output signal f of the one-shot multivibrator circuit 18, releases an H level output g. A self-hold circuit 21 is enabled by the output signal g of H level and releases an H level output h.

The output h is transmitted to the self-hold circuit 16 which in turn is reset and to a delay circuit 22 which gives a delay time of T1. An output i of the delay circuit 22 is fed to the AND circuit 12. As the other input of the AND circuit 12 is loaded with the H level signal, the output signal i is passed to the base of a transistor 23 which is then turned on. This enables an upward movement relay R2 to switch the directional valve for upward movement of the ram. As the ram starts moving upward, the contact of the lower LS 4 is closed hence shifting its output signal e to H level as shown. In response to the H level signal e, the output g of the NOR circuit 20 is turned to L level.

When the ram travels upward and arrives at the upper limit at a time t4, the contact of the upper LS 2 is closed allowing the self-hold circuit 21 to receive the reset signal a. As the self-hold circuit 21 has been reset, the upward movement relay R2 is disabled thus ceasing the movement of the ram.

Meanwhile, the delay circuit 19 has a delay time of T2 which is longer than the duration (from t2 to t3) of opening the contact of the lower LS 4. This allows an AND circuit 24 to constantly release an output k of L level, not triggering the resetting action of the self-hold circuits 16 and 21.

Figure 3:
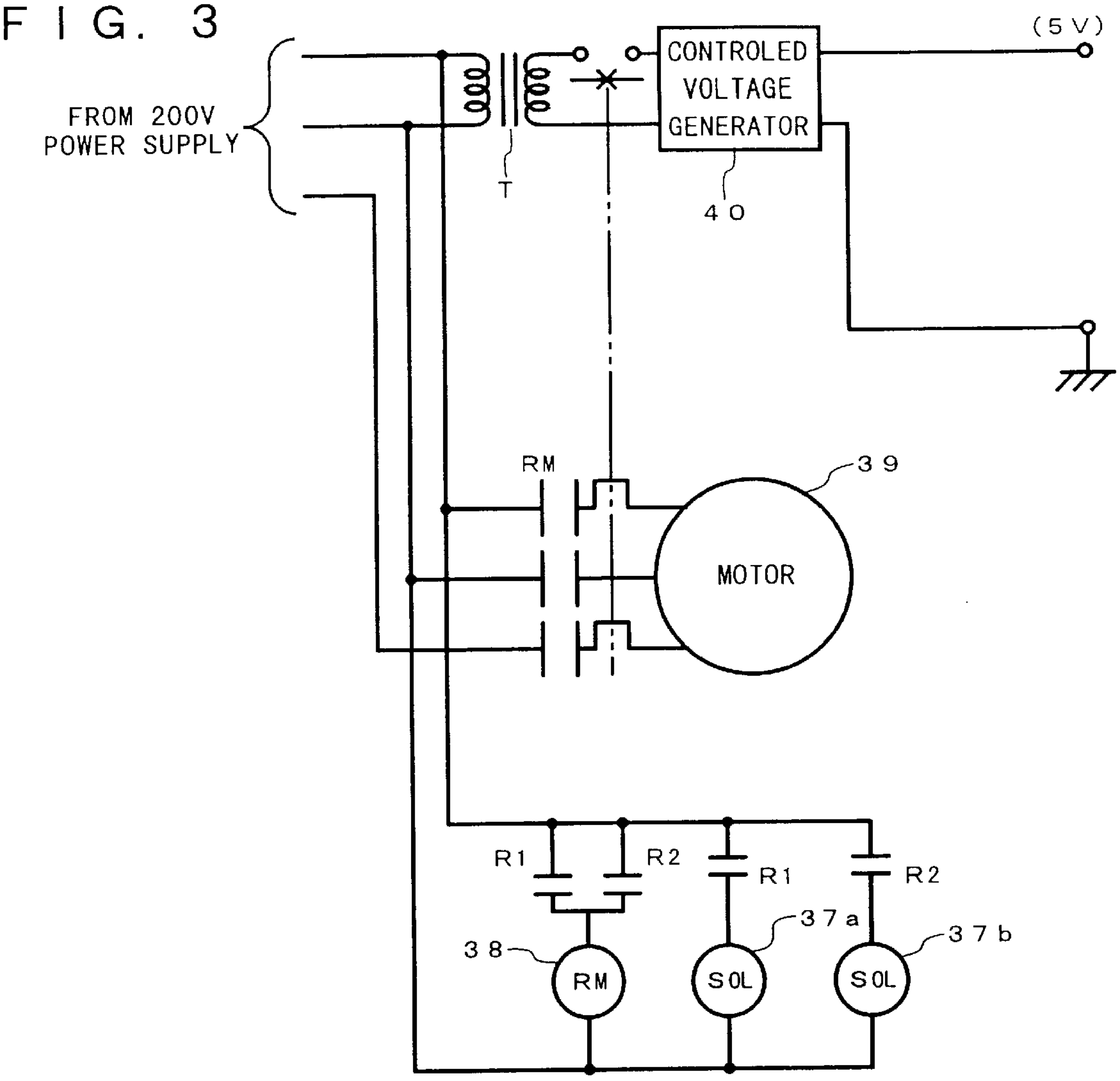
FIG. 3 is a circuitry diagram of a drive circuit for directional valve solenoids and a motor.
Figure 8:
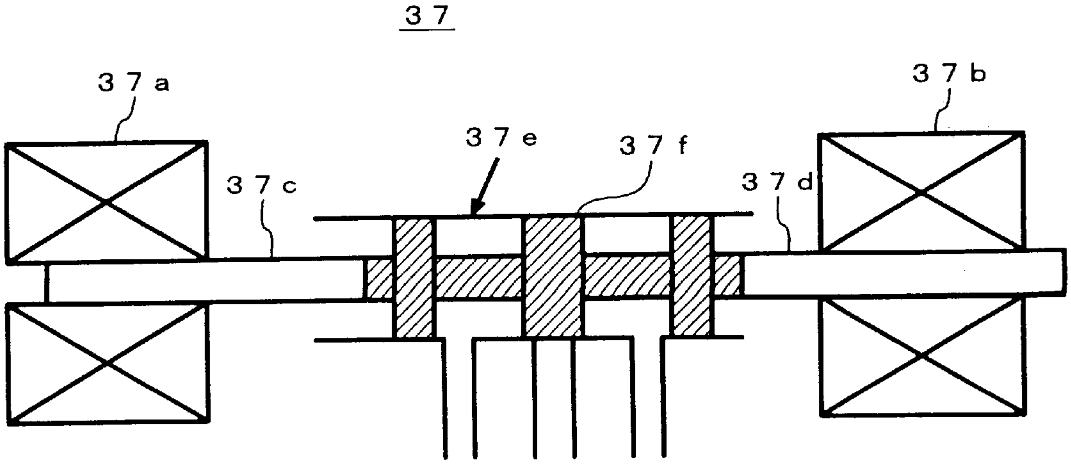
FIG. 8 is a schematic view showing a hydraulic directional valve mechanism.

Referring to FIG. 3, the relation between the downward and upward movement relays R1, R2 and the first and second solenoids 37*a* and 37*b* shown in FIG. 8 will be explained in conjunction with the action of a hydraulic pump. When the downward movement relay R1 is enabled, the first solenoid 37*a* and a motor relay 38 shown in FIG. 3 are turned on.

The first solenoid 37*a* then drives its pushrod to shift the directional valve for lowering the ram. When the motor relay 38 is turned on, a motor 39 is energized and starts rotating. On the other hand, when the upward movement relay R2 is enabled, both the second solenoid 37*b* and the motor relay 38 are turned on. Accordingly, the directional valve is driven by the pushrod of the second solenoid 37*b* for lifting up the ram. Simultaneously, the motor 39 is energized and starts rotating. A controlled voltage generator 40 generates, for example, a 5 volt voltage.

Figure 4:
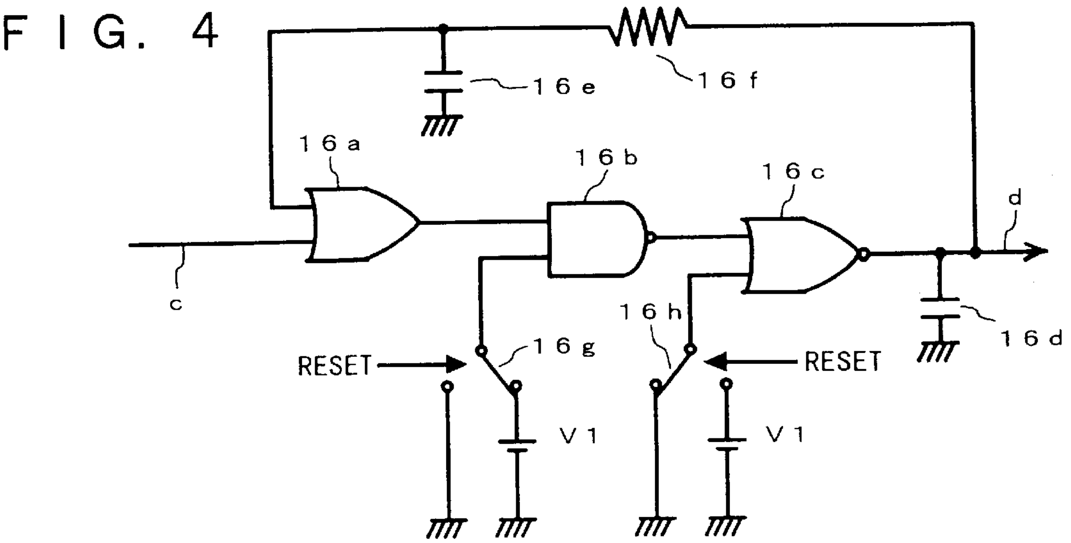
FIG. 4 is a circuitry diagram of a self-hold circuit.

An example of the self-hold circuit 16 or 21 will be explained referring to FIG. 4. The self-hold circuit 16 comprises an OR circuit 16*a*, a NAND circuit 16*b*, a NOR circuit 16*c*, capacitors 16*d* and 16*e*, a resistor 16*f*, and switching means 16*g* and 16*h* which are connected in a combination as shown. It is assumed that when the switching means 16*g* and 16*h* are loaded with the reset signals, they select 0 volt and V1 volt respectively.

When the self-hold circuit 16 receives the signal c of H level, its OR circuit 16*a* delivers an H level output, its NAND circuit 16*b* releases an L level output and its NOR circuit 16*c* delivers an H level output thus allowing the capacitor 16*e* to be charged. This feeds an H level signal to the other input of the OR circuit 16*a*. Thus, the output of the NOR circuit 16*c* is maintained at H level when the signal c is turned to L level.

When the switching means 16*g* is loaded with the reset signal, it selects 0 volt. Accordingly, the outputs of the NAND circuit 16*b* and the NOR circuit 16*c* are shifted to H level and L level respectively causing the resetting of the self-hold circuit 16. When the switching means 16*h* is loaded with the reset signal, it selects V1 volt. Accordingly, the output of the NOR circuit 16*c* is shifted to L level causing the resetting of the self-hold circuit 16.

As understood from the above description, the embodiment of the present invention allows the ram to move downward for punching a workpiece when the start switch 3 shown in FIG. 1 is switched on, and automatically move upward and stop at the upper limit of its movement. Even if the start switch 3 is kept switched on, the ram will not travel again after it returns to the upper limit. This action is guaranteed by the one-shot multivibrator circuit 15 which is connected to the start switch 3 and enabled only by a short rise signal produced when the start switch 3 is switched on and remains disabled when the start switch 3 is kept closed.

In case that hard impact caused by the ram punching out a workpiece during downward movement triggers unwanted opening or chattering of the contact of the lower LS 4, the signal e is instantly dropped to L level (denoted at e') as represented by the dotted line in FIG. 2 causing the one-shot multivibrator circuit 18 to release a pulse signal f'60 of a given width. At the time, the output of the NOR circuit 20 remains intact. This allows the self-hold circuit 21 not to change its output h to H level thus preventing the ram from being affected by the impact of punching action and starting upward movement before it arrives at the lower limit.

Also, the delay circuit 22 is provided for delaying the action of the upward relay R2 after the ram arrives at the lower limit and the lower LS 4 is opened. In other words, the duration T1 for disabling the two relays R1 and R2 is inserted between the turning off of the downward movement relay R1 upon the ram arriving at the lower limit and the turning on of the upward movement relay R2. This permits the first solenoid 37*a* shown in FIG. 3 to be clearly demagnetized in the duration T1 and protect its pushrod from being excessively stressed to deformation.

Figure 5:
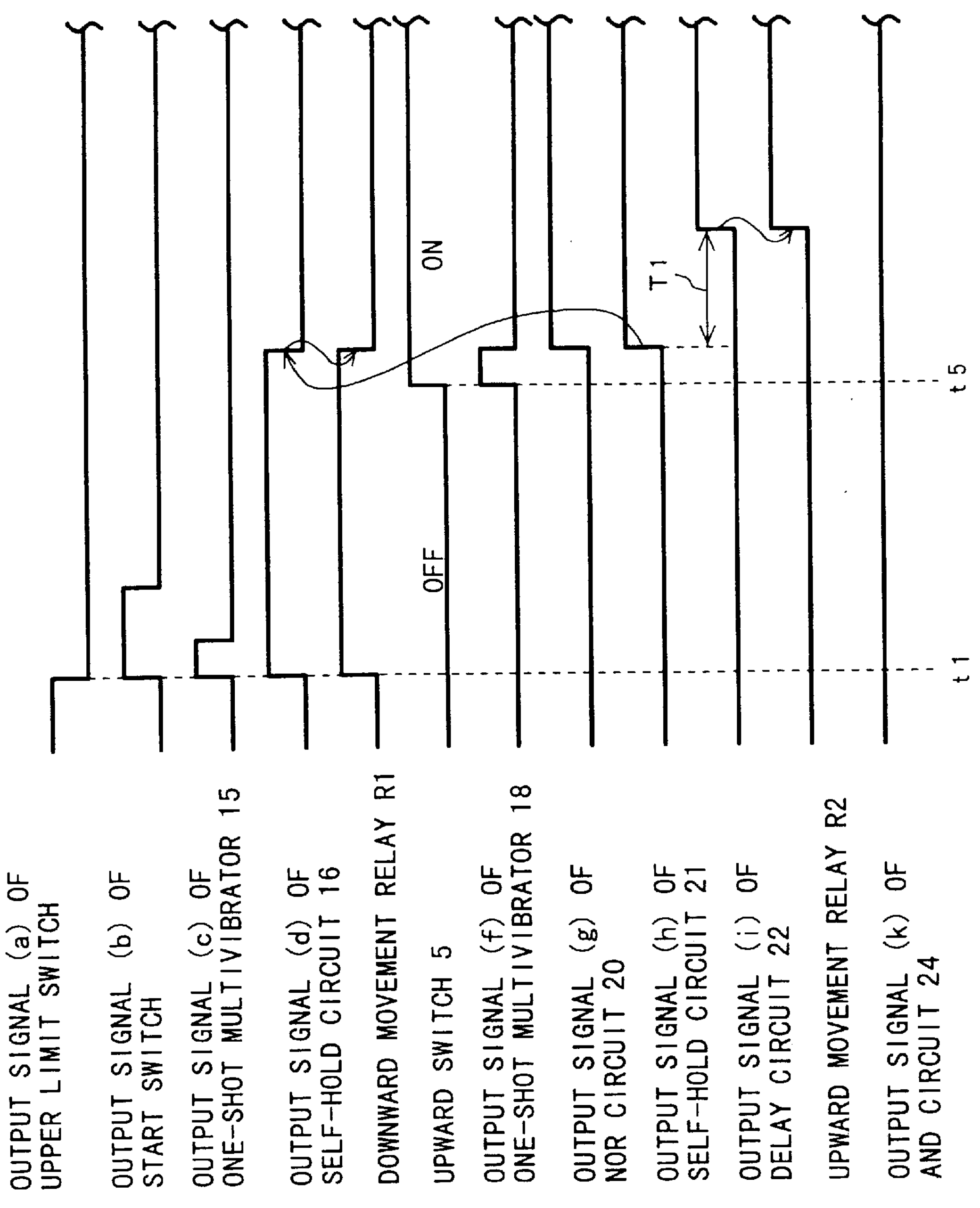
FIG. 5 is a timing chart showing actions when the upward movement switch is turned on during the downward movement of a ram.

The operation when the upward SW5 is interruptedly shifted to the dotted line denoted position, shown in FIG. 1, during the downward movement of the ram will now be explained referring to FIG. 5. As shown in FIG. 5, the duration from t1 where the start SW3 is switched on to t5 where the upward SW 5 is pressed interruptedly is similar to that shown in FIG. 2 and will be explained in no more detail.

When the upward SW 5 is switched on at t5, the NOR circuit 20 shifts its output g to H level in response to the decay of the output f of the one-shot multivibrator circuit 18. This changes the output h of the self-hold circuit 21 to H level after a specific length of time (for example, when the capacitors 16*d* and 16*e* have been charged up). The output h is the reset signal for the self-hold circuit 16. The output d of the self-hold circuit 16 is thus shifted to L level disabling the transistor 17 to stop the downward movement of the ram. Also, the output signal h is fed to the delay circuit 22 where it is delayed by T1 and transmitted as the signal i to one of the two inputs of the AND circuit 12. This turns on the transistor 23 to enable the upward movement relay R2. As the result, the ram starts moving upward. According to the embodiment, whenever the upward SW 5 is pressed during the downward movement of the ram, the ram stops its downward movement and after T1, starts moving upward. During the length of T1, the remaining magnetism in the first solenoid 37*a* best shown in FIG. 3 is eliminated hence preventing its pushrod from being stressed and deformed. It is clearly understood from the above description that the ram remains not starting when the upward SW 5 is continuously pressed down.

Figure 6:
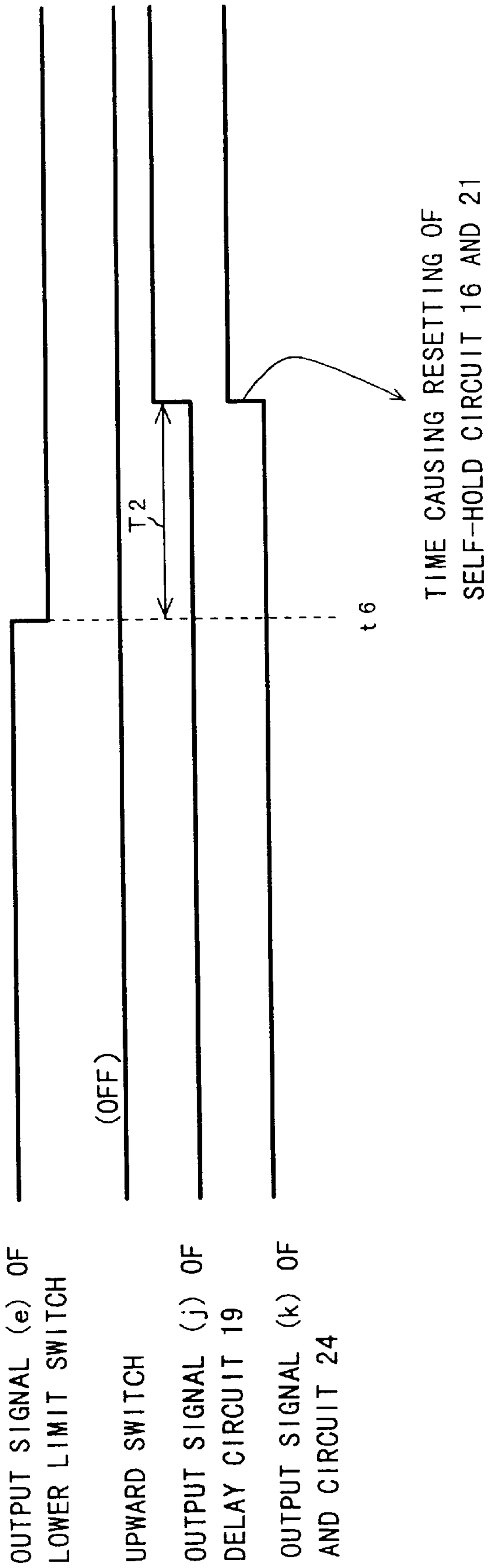
FIG. 6 is a timing chart showing actions when something unusual occurs.

The operation when line disconnection in the lower LS 4 is caused by vibration of the ram, i.e. something unusual occurs, will be explained referring to the timing chart of FIG. 6. It is assumed that disconnection of a line in the lower LS 4 occurs at t6 shown in FIG. 6, the output e of the lower LS 4 is turned from H level to L level and remains at L level. The delay circuit 19 in response to L level of the output e shifts its output j to H level after T2 and maintains its level. This causes the output k of the AND circuit 24 to change to H level resetting the self-hold circuits 16 and 21. Accordingly, the lower R1 and the upper movement relay R2 are disabled hence indicating that something unusual occurs.

For manual operation of the hydraulic driven tool controlling apparatus of the embodiment, the auto/manual selector switch 1 shown in FIG. 1 is turned to the manual position. This energizes one group of the AND circuits 13, 14 and deenergizes the other group of the AND circuit 11 and 12. As long as the start SW 3 is depressed, the transistor remains turned on for allowing the ram to move downward until it arrives at the lower limit. The downward movement of the ram is stopped when the contact of the lower LS 4 opens. If the upward SW 5 is continuously pressed, the transistor 26 remains turned on for allowing the upward movement of the ram. When it is detected by the upper LS 2 that the ram arrives at the upper limit, the upward movement of the ram stops.

It would be understood that the prescribed embodiment of the present invention is illustrative but not of limitation and various changes and modifications are possible without departing from the scope of the present invention.

Industrial Applicability

As set forth above, the present invention allows a turn-on detecting signal output means to deliver a turn-on detection signal in response to every turn-on action of a start switch means and even if the turn-on-action is continued, release no more detection signal. Accordingly, unwanted restart of a hydraulic driven tool will be prevented when the start switch means remains turned on adversely.

Also, the present invention provides a pause period in the switching action of a directional valve between the downward movement and the upward movement for allowing a directional valve controlling means to eliminate the remaining magnetism in either solenoid of the directional valve during the pause period. This will prevent two pushrods of their respective solenoids from urging against each other due to the remaining magnetism at one side and the magnetizing action at the other side, contributing to the fault preventative feature of the directional valve.

Furthermore, the present invention permits the directional valve controlling means to be protected from chattering of a lower limit detecting means, which detects the arrival of a ram at the lower limit, caused by the ram producing a great force of impact when punching out a workpiece, whereby malfunction of the hydraulic driven tool will be avoided.

We claim:

1. A hydraulic driven tool controlling apparatus for driving upward and downward movements of a ram in a cylinder with the use of hydraulic power, comprising:

a lower limit detecting means for detecting the lower limit of a movement of the ram;

a directional valve controlling means responsive to a detection signal from the lower limit detecting means for shifting a flow of hydraulic oil which acts on the ram from the downward movement to the upward movement; and a fault action preventing means for absorbing chattering of the lower limit detecting means caused by vibration of the ram thus to prevent the directional valve controlling means from producing a fault derived from the chattering.

2. A hydraulic driven tool controlling apparatus according to claim 1, wherein the fault action preventing means for preventing a fault action of the directional valve controlling means derived from the chattering comprises a logical product means which receives the detection signal from the lower limit detecting means with a time delay of a given length.

* * * * *